Oct. 6, 1931.                W. A. WINDER                1,825,839
             HIGH PRESSURE LEAK DETECTOR FOR AUTOS
                        Filed Oct. 3, 1928
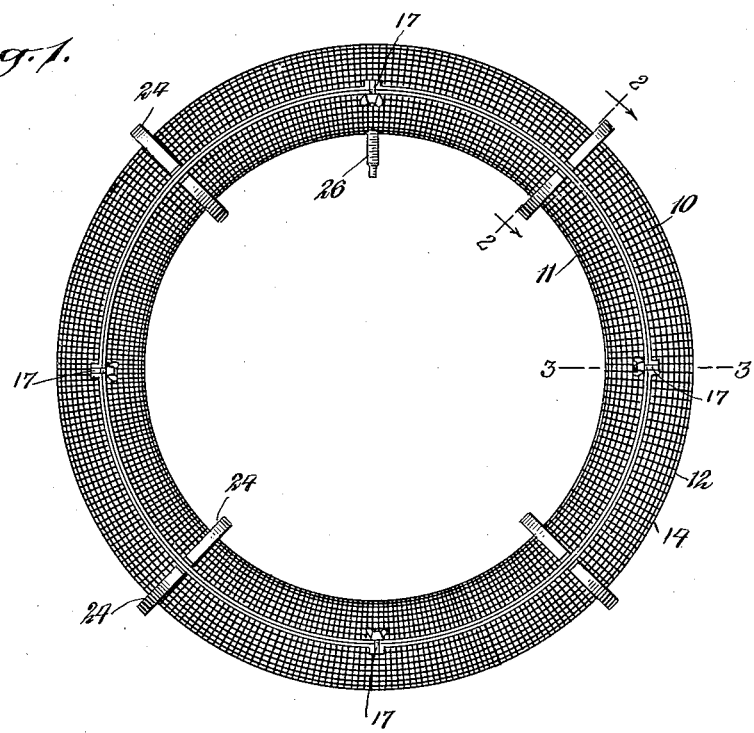
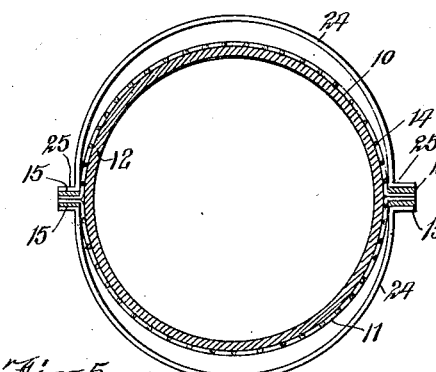
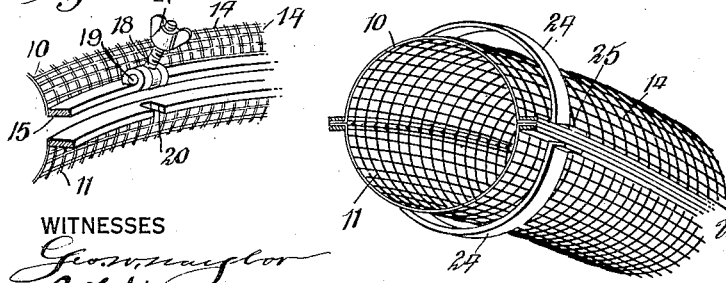
WITNESSES
INVENTOR
William A. Winder
BY
ATTORNEY Patented Oct. 6, 1931

1,825,839

UNITED STATES PATENT OFFICE

WILLIAM A. WINDER, OF PORTLAND, OREGON

HIGH PRESSURE LEAK DETECTOR FOR AUTOS

Application filed October 3, 1928. Serial No. 310,103.

This invention relates to leak detectors for the inner tubes of pneumatic tires. In the detection of leaks in pneumatic tire inner tubes, it is commonly found necessary to immerse the tube in water, while inflated. The leak may thus readily be detected by noting the bubbles of escaping air from the tube. In the detection of high pressure leaks, that is, those leaks from which air does not escape, except when excessive pressures are used within the tube, it is necessary to use such pressures within the tube that they become dangerous due to the fact that without the tire casing retaining the tube in position, they may expand to such an extent that their walls become weakened and a rupture in the tube may result.

It is among the principal objects of the present invention to provide means within which an inner tube may be safely inflated to abnormal pressures without danger of rupture.

A further object of the invention is to provide a casing for inner tubes within which the tube may be inflated and submerged to detect the leak, the casing being such that substantially full visibility of the tube may be had during the operation.

A further object of the invention is to provide an apparatus of the class described which will be simple in construction, and operation, and which will lend itself readily to economic manufacture.

Other objects of the invention include the combination and interrelation of parts forming a novel and improved structure of the class described. It will readily be understood that numerous other objects and features of the invention will be apparent from a consideration of the following specification taken in connection with the accompanying drawings, in which—

Fig. 1 is a front elevation of my invention in operative position with an inner tube therein.

Fig. 2 is a sectional view taken on line 2—2 of Fig. 1.

Fig. 3 is a sectional view taken on line 3—3 of Fig. 1.

Fig. 4 is a perspective view partly broken away showing my invention with the inner tube removed.

Fig. 5 is a detail view illustrating one form of fastening means which may be employed with my invention.

Referring more particularly to the drawings, there is provided a casing member including an external portion 10 and an internal portion 11, both of which are semicircular in cross section, and adapted for correlation to provide an annular casing of circular cross section adapted to receive therein the inner tube of a pneumatic tire as illustrated at 12.

The casing members 10 and 11 are preferably formed of mesh construction, such as provided by the crossed wires 14 as illustrated. The opposite edges of the mesh material are secured to suitable edge flanges 15, the edge flanges of the external and internal sections 10 and 11 being adapted to abut each other and to be secured together upon one side by a suitable retaining bracket 16, while retained together on the opposite side by suitable threaded engagement 17 illustrated in detail in Fig. 5. This engaging member includes a T-bolt 18, the cross portion of which is secured to the upper rim 15 as by the struck-out portions 19 thereof. The threaded shank of the bolt 18 is adapted to be received within a cutout portion 20 of the lower rim 15; a wing nut 21 being provided and adapted to abut the under side of this rim to secure the members 10 and 11 in the relation disclosed in Figs. 2 and 3.

For manipulating the casing for submersion of an enclosed tube, there is provided a plurality of handles 24 substantially U-shaped in cross section, their extremities being bent outwardly as at 25 to provide an engaging surface with the member 15 to which the handles 24 may be suitably secured by soldering, welding, or the like. The inner casing 11 is also preferably provided with an aperture through which the valve stem 26 of the inner tube 12 may be passed, thus providing for the inflation under high pressure of the inner tube after the casing has been applied.

In the operation of the device it will be appreciated that the rigid casing member will permit inflation of the inner tube under excessive pressures without permitting expansion of the inner tube which draws the material thereof out, and subjects it to the liability of rupture, thus endangering the tester. With the present apparatus, a leak may be readily detected by noting the portion of the inner tube from which air bubbles are escaping when the tube is immersed. It will be understood that the mesh is of such material that it will not interfere with the visibility of the inner tube or with the escape of air from a leaking portion thereof.

Thus, it may be readily seen that the invention provides a new and improved apparatus for use in connection with the testing of inner tubes for the location of high pressure leaks; the apparatus being such that damage to the inner tube due to the unusual pressure of inflation used, or danger to the tester is avoided; the whole forming a reliable economic article which does not require a skilled mechanic for its operation. It will be understood that numerous changes and alterations and the full use of equivalents in the construction of the apparatus may be resorted to without departing from the spirit or scope of the appended claim.

I claim:

In a device of the character described, a casing adapted to receive an inner tube, said casing including two annular semi-circular members formed of mesh material, edge flanges associated with each of said mesh members to provide a pair of co-operating flanges on each side of said casing, the one pair of said flanges having registering struck-out and cut-out portions, said mesh members being adapted to be secured together with their co-operating flanges in abutting relation, means adapted to secure said flanges in said abutting relation, said means including a retaining bracket for one pair of said flanges said retaining bracket being substantially U-shaped in cross-section and angular in configuration and T-bolts secured to one of the flanges of the opposite pair of said struck-out portions of said flange, said T-bolts being received in said registering cut-out portions of the co-operating flange, and U-shaped operating handles fastened at their extremities to said flanges, said handles being bent to lie over and extend beyond said mesh members for a portion of the length of said handles.

WILLIAM A. WINDER.